US012589973B2

(12) United States Patent
Roussel et al.

(10) Patent No.: US 12,589,973 B2
(45) Date of Patent: Mar. 31, 2026

(54) METHOD AND ELEVATOR CONTROL ARRANGEMENT FOR CONTROLLING A MAINTENANCE MODE OF AN ELEVATOR SYSTEM

(71) Applicant: Inventio AG, Hergiswil (CH)

(72) Inventors: Frank Olivier Roussel, Lucerne (CH); Markus Walker, Ziefen (CH)

(73) Assignee: INVENTIO AG, Hergiswil (CH)

( * ) Notice: Subject to any disclaimer, the term of this patent is extended or adjusted under 35 U.S.C. 154(b) by 1407 days.

(21) Appl. No.: 17/250,558

(22) PCT Filed: Sep. 19, 2019

(86) PCT No.: PCT/EP2019/075210
§ 371 (c)(1),
(2) Date: Feb. 3, 2021

(87) PCT Pub. No.: WO2020/064510
PCT Pub. Date: Apr. 2, 2020

(65) Prior Publication Data

US 2021/0316961 A1 Oct. 14, 2021

(30) Foreign Application Priority Data

Sep. 25, 2018 (EP) .................................... 18196551

(51) Int. Cl.
*B66B 5/00* (2006.01)

(52) U.S. Cl.
CPC ............ *B66B 5/0087* (2013.01); *B66B 5/005* (2013.01)

(58) Field of Classification Search
CPC .............................. B66B 5/0087; B66B 5/005
(Continued)

(56) References Cited

U.S. PATENT DOCUMENTS 7,793,762 B2 9/2010 Zaharia et al.
2002/0157828 A1 10/2002 King et al.
(Continued)

FOREIGN PATENT DOCUMENTS

CN 102040130 A 5/2011
CN 102992127 A 3/2013
(Continued)

*Primary Examiner* — Kawing Chan
(74) *Attorney, Agent, or Firm* — Shumaker, Loop & Kendrick, LLP

(57) ABSTRACT

A method for controlling a maintenance mode of an elevator system includes: recognizing a machine-detectable feature in an automated manner using a portable computer-controlled device of a technician and, subsequently, outputting a maintenance completion signal, the machine-detectable feature being within the elevator system such that it can only be detected by the computer-controlled device located outside an elevator shaft of the elevator system and wherein the machine-detectable feature is uniquely assigned to the elevator system; receiving the maintenance completion signal by an elevator controller controlling the maintenance mode and, subsequently, completing the maintenance mode. The method and an elevator control arrangement configured to carry out the method enables a maintenance mode to be completed by the technician in the elevator system in a simple, intuitive, and safe manner without the need for significant additional hardware.

11 Claims, 1 Drawing Sheet

5 PORTABLE COMPUTER-CONTROLLED DEVICE
7 MACHINE-READABLE FEATURE
8 RFID TRANSPONDER
9 ELEVATOR CONTROLLER
11 DATA CLOUD
23 ELEVATOR DRIVE

(58) Field of Classification Search
USPC .......................................................... 187/247
See application file for complete search history.

(56) References Cited

U.S. PATENT DOCUMENTS

| | | | |
|---|---|---|---|
| 2004/0094366 | A1 | 5/2004 | Weinberger et al. |
| 2008/0062981 | A1* | 3/2008 | Gerstenkorn ......... B66B 1/3407 187/247 |
| 2008/0272931 | A1 | 11/2008 | Auzerais et al. |
| 2016/0376124 | A1* | 12/2016 | Bünter .................... B66B 1/468 187/247 |
| 2018/0244496 | A1 | 8/2018 | Walker |
| 2018/0320503 | A1 | 11/2018 | Smith et al. |

FOREIGN PATENT DOCUMENTS

| | | | |
|---|---|---|---|
| CN | 103287942 | B * | 8/2015 |
| EP | 1882666 | A1 | 1/2008 |
| EP | 2072450 | A1 | 6/2009 |
| JP | 2007084191 | A | 4/2007 |
| JP | 2009161310 | A | 7/2009 |
| JP | 2010095359 | A | 4/2010 |
| WO | 2017042306 | A1 | 3/2017 |

* cited by examiner

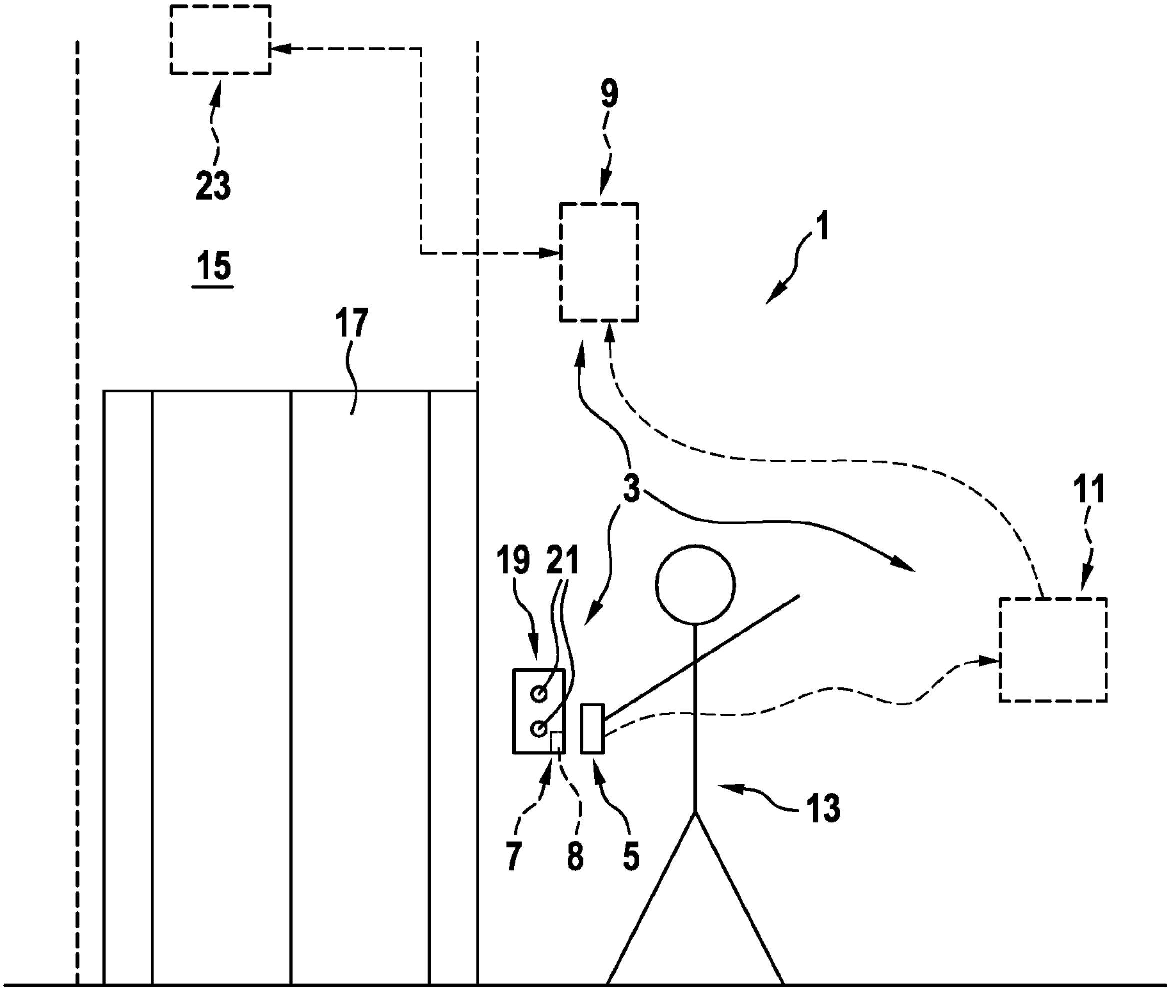
5 PORTABLE COMPUTER-CONTROLLED DEVICE
7 MACHINE-READABLE FEATURE
8 RFID TRANSPONDER
9 ELEVATOR CONTROLLER
11 DATA CLOUD
23 ELEVATOR DRIVE

METHOD AND ELEVATOR CONTROL ARRANGEMENT FOR CONTROLLING A MAINTENANCE MODE OF AN ELEVATOR SYSTEM

FIELD

The present invention relates to a method and an elevator control arrangement for controlling a maintenance mode of an elevator system.

BACKGROUND

Elevator systems are usually used for the vertical transport of people and/or goods within buildings. As a rule, an elevator car is moved within an elevator shaft for this purpose.

In order to be able to ensure a safe and reliable operation of the elevator system, it generally has to be serviced at specific time intervals. In the scope of a maintenance operation, it may be necessary for a maintenance technician to enter the elevator shaft, for example, in order to carry out maintenance measures in an elevator shaft pit. During such maintenance measures, the elevator system can be switched into a maintenance mode. In such a maintenance mode, for example, normal operation of the elevator system can be temporarily suspended so that passengers can no longer request the elevator car or cause the elevator car to move to a destination floor. Instead, the maintenance technician can be allowed during the maintenance mode to control a movement of the elevator car from a special maintenance panel. The maintenance panel can be arranged inside the elevator shaft outside the elevator car, for example on a roof of the elevator car or in the elevator shaft pit. In addition, during the maintenance mode, the possibilities of how the elevator car may be moved within the elevator shaft can be restricted in order, for example, to protect the technician from a collision with the elevator car.

Regulations, such as European standard EN 81-20, specify the functional requirements that an elevator system must meet while it is operated in a maintenance mode. Among other things, the conditions under which the elevator system may complete a maintenance mode and return to a normal mode are also specified. Such regulations require, among other things, that an electrical reset apparatus must be actuated outside the elevator shaft in order to be able to complete the maintenance mode of the elevator system, possibly taking into account other conditions. It must be ensured that the reset apparatus is only accessible to authorized persons, i.e., is arranged, for example, in a lockable housing adjacent to the door that allows access to the elevator shaft pit.

Previous technical implementations of such reset apparatuses required a considerable technical and logistical effort; for example, providing a lockable housing, a key switch to be provided therein, and providing the maintenance technician with corresponding keys.

In WO 2017/042306 A1, an alternative approach for monitoring a maintenance mode in an elevator system is described. In this approach, hardware that has to be provided in the elevator system for other purposes is used in a special way in order to be able to complete a maintenance mode authorized by a maintenance technician. However, during the practical implementation of this approach, it was observed that operating errors or manipulation attempts cannot be reliably prevented in all cases.

SUMMARY

Among other things, there may be a need for a method and an elevator control arrangement with the aid of which a maintenance mode in an elevator system can be completed using means that are easy to implement and/or with high reliability while at the same time adhering to high safety requirements.

Such a need can be met with the subject matter according to and the advantageous embodiments specified in the description below.

According to a first aspect of the invention, a method for controlling a maintenance mode of an elevator system is proposed. The method comprises recognizing a machine-detectable feature in an automated manner using a portable computer-controlled device of a technician and, subsequently, outputting a maintenance completion signal. The machine-detectable feature is in this case held within the elevator system in such a way that it can only be detected by a computer-controlled device which is located outside an elevator shaft of the elevator system. In addition, the machine-detectable feature of the elevator system is uniquely assigned. The method further comprises receiving the maintenance completion signal by an elevator controller controlling the maintenance mode and, subsequently, completing the maintenance mode, said completing operation preferably being automatically generated by the elevator controller.

According to a second aspect of the invention, an elevator control arrangement for controlling a maintenance mode in an elevator system is proposed. The elevator control arrangement is configured in this case to execute or control a method according to an embodiment of the first aspect of the invention.

In a specific embodiment, the elevator control arrangement has a machine-detectable feature, a portable computer-controlled device, and an elevator controller that controls the maintenance mode. The machine-detectable feature is in this case held within the elevator system in such a way that it can only be detected by a computer-controlled device which is located outside an elevator shaft of the elevator system. In addition, the machine-detectable feature of the elevator system is uniquely assigned. The portable computer-controlled device is configured to automatically recognize the machine-detectable feature and then to output a maintenance completion signal. The elevator controller controlling the maintenance mode is configured to complete the maintenance mode when receiving the maintenance completion signal.

According to a third aspect of the invention, a computer program product is proposed that includes computer-readable instructions which instruct a programmable elevator control arrangement, in particular an elevator control arrangement according to an embodiment of the second aspect of the invention, to execute or control a method according to an embodiment of the first aspect of the invention.

According to a fourth aspect of the invention, a computer-readable medium is proposed having a computer program product stored thereon, according to an embodiment of the third aspect of the invention.

Possible features and advantages of embodiments of the invention may be considered, inter alia, and without limiting the invention, as being based on the ideas and findings described below.

As already indicated in the introduction, the aim is to be able to complete a maintenance mode in which an elevator system is located while maintenance work is being carried out in it, in which on the one hand specific legal or other regulations are complied with and in which on the other hand no or only little additional hardware operation is required. Said operation is intended, on the one hand, to ensure that the maintenance mode can only be completed when specific safety conditions are met within the elevator system, i.e., for example, all elevator doors and possibly also a door to an elevator shaft pit are closed, and when the maintenance technician is located outside the elevator shaft. On the other hand, it should be possible for the maintenance technician to complete the maintenance mode in a simple and nevertheless safe and reliable manner. If possible, little or no additional hardware should be required. In addition, it can be seen as advantageous that structural precautions that have to be taken in order to be able to complete the maintenance mode in the desired manner do not, if possible, disrupt the visual appearance of the elevator system, i.e., the design thereof.

In order to be able to meet these requirements, it is proposed to use a portable computer-controlled device of a technician in order to be able to automatically recognize a machine-detectable feature and then to output a maintenance completion signal, upon receipt of which an elevator controller that controls the maintenance mode of the elevator system completes the maintenance mode.

The portable computer-controlled device can be, for example, a smartphone, notebook, notepad, or the like. In particular, the device should be sufficiently small to be portable, i.e., to be able to be carried by the technician without undue effort. In particular, the portable device should have a weight of less than 5 kg, preferably less than 0.5 kg, for example.

The portable device should be computer-controlled, i.e., should at least have a processor and, as a rule, also have a data storage device, so that signals can be processed and temporarily stored. In particular, it can be advantageous if the portable device can be programmed with the aid of special application programs ("apps") to perform various tasks. The portable, computer-controlled device can be used by the technician for a variety of purposes, for example for telephoning, as a planner, as a camera, etc. Accordingly, the probability can be high that the technician will always have this device with him; therefore, only said device needs to be enabled using an application program in order to implement the functionality described herein for completing a maintenance mode of the elevator system.

Furthermore, the portable device should preferably have interfaces via which data or signals can be read in and/or output. The portable device can read in information about the surroundings via the interfaces and/or can output information or signals to other devices. Such interfaces can be implemented in the form of sensors, with the aid of which conditions in the surroundings can be recorded. For example, a magnetic field sensor can detect a magnetic field in the region of the portable device. Alternatively or in addition, a camera can record an optical image of the surroundings of the portable device. One or more of the interfaces can also be designed as data communication paths via which data or signals can be exchanged with other devices. The data communication paths can be wired or wireless. For example, the data communication paths can be implemented in the form of a radio connection, in particular a WLAN or Bluetooth connection.

The technician's portable computer-controlled device should be configured to be able to automatically recognize a specific machine-detectable feature and, when it is recognized, to output a maintenance completion signal, for example via one of the interfaces thereof.

The machine-detectable feature can, as stated in more detail below, be technically implemented in different ways. In any case, it should be implemented in such a way that it can be recognized by the technician's portable computer-controlled device in an automated manner, i.e., for example without the technician's intervention, as soon as the device approaches the machine-detectable feature in a predeterminable spatial configuration.

The machine-detectable feature should be uniquely assigned to a respective elevator system. In other words, a unique machine-detectable feature assigned to it should be provided for each elevator system. Accordingly, when the machine-detectable feature is recognized, information about the identity of the corresponding elevator system can also be obtained. This information can possibly be used to output the maintenance completion signal to be generated by the computer-controlled device to the correct elevator control, i.e., the elevator controller of the corresponding elevator system.

It is substantial in this case that the machine-detectable feature is provided in the elevator system in such a way that it can only be detected by the portable computer-controlled device when this device is located outside the elevator shaft of the elevator system. For example, the machine-detectable feature can be held at a location remote from the elevator shaft. It can be designed in such a way that it can only be read out if the portable computer-controlled device comes sufficiently close to the machine-readable feature or is positioned in relation to it at a predetermined position outside the elevator shaft. It can thus be ensured that at the point in time at which the portable computer-controlled device recognizes the machine-detectable feature, the technician who is carrying the device is located outside the elevator shaft.

When the portable computer-controlled device has generated and output the maintenance completion signal, this can be passed to the elevator controller, which controls the maintenance mode within the elevator system. When the elevator controller receives this maintenance completion signal, it can then complete the maintenance mode of the elevator system. The elevator system can then return to its normal operating mode.

Overall, the maintenance completion signal can therefore only be generated and the maintenance mode of the elevator system can only be completed if the technician has a portable computer-controlled device with him that is suitably configured to recognize the machine-detectable feature of the elevator system and then to generate the maintenance completion signal, and if the technician is also located outside the elevator shaft and in sufficient proximity to the machine-detectable feature.

As a consequence, the maintenance completion signal can only be generated by a person such as the maintenance technician who authorizes himself to complete the maintenance mode by having the described and suitably configured portable computer-controlled device with him. The technician's device, i.e., for example, the smartphone configured with a special application program, acts like a key with which the technician authenticates himself as authorized to complete the maintenance mode.

Furthermore, the maintenance completion signal can only be generated when the technician having his portable device is located outside the elevator shaft of the elevator system.

This ensures, on the one hand, that only authorized persons are allowed to complete a maintenance mode of the elevator system. On the other hand, it is also ensured that the technician completing the elevator mode is located outside a danger region, i.e., outside the elevator shaft. The entire process of completing the maintenance mode can be carried out in a simple, intuitive, and/or reliable manner. The portable device, which is usually carried by the technician anyway, can be used without the need for additional complex hardware to be provided in the elevator system.

According to one embodiment of the proposed method, the technician has to authorize himself using the portable computer-controlled device before outputting the maintenance completion signal.

In other words, the portable computer-controlled device can request that the user authorize himself in a suitable manner before it outputs the maintenance completion signal, upon receipt of which the elevator controller, subsequently, completes the maintenance mode. The authorization operation can take place, for example, in that the user must input a personal identification number (PIN) known only to him or another type of authentication is required. This can ensure that the portable computer-controlled device is not used by anyone other than the maintenance technician authorized for this purpose to complete the maintenance mode of the elevator system. The authorization request before outputting the maintenance completion signal has a similar effect to the need to unlock a lock in conventional, mechanically secured reset apparatuses.

According to one embodiment, the machine-detectable feature is held using an RFID transponder. In this case, the portable computer-controlled device recognizes the machine-detectable feature by reading out the RFID transponder.

RFID stands for "radio frequency identification" and describes a technology for transmitter-receiver systems for the automatic and contactless identification and localization of objects using radio waves. The RFID transponder can passively or actively reflect a radio wave signal emitted by a reader if the reader comes sufficiently close to the RFID transponder. The radio wave signal can be modified in a predefined manner so that the reader can infer the existence of the RFID transponder when it receives the reflected signal. If necessary, further information can be transmitted with the reflected signal, which allows the reader to recognize the identity of the RFID transponder. The RFID transponder can optionally be made available in a very small and thus space-saving manner and kept in the elevator system. For example, the RFID transponder can be implemented in the form of a circuit applied to a film or another substrate. In particular, the RFID transponder can, for example, be kept in a hidden place or behind a panel or an overlying layer, so that it does not affect the visual appearance of the elevator system. Costs for manufacturing and installing the RFID transponder can be low.

The technician's portable computer-controlled device can have a suitable sensor system in order to be able to act as a reader for the RFID transponder and to be able to process the information read from the RFID transponder. As a result, the portable computer-controlled device, if it is brought close enough, i.e., to less than 20 cm or less than 10 cm, to the RFID transponder, can perceive the existence thereof and recognize it as a machine-detectable feature within the scope of the method presented herein. The portable computer-controlled device can also infer the identity of the elevator system from the information returned by the RFID transponder, provided that a uniquely assigned RFID transponder is available for each elevator system.

According to an alternative embodiment, the machine-detectable feature is provided by an optically recognizable feature arrangement that is uniquely assigned to the elevator system. In this case, the portable computer-controlled device recognizes the machine-detectable feature by optically recognizing the optically recognizable feature arrangement.

In other words, the machine-detectable feature can be stored in the elevator system in the form of a feature arrangement, which can be optically recognized. The feature arrangement can be formed by various visually distinguishable measures. For example, optically perceptible objects can be set up in the elevator system in a specific relation to one another and/or their surfaces can have optically perceptible properties such as colors, patterns, etc.

The optically recognizable feature arrangement can preferably be unique for a relevant elevator system, so that the identity of this elevator system can be uniquely recognized by means of the individual feature arrangement. If necessary, the optically recognizable feature arrangement can be characterized in the scope of a learning process, for example by image analysis, so that it can be recognized again in subsequent image analyses. In this case, the optically recognizable feature arrangement can preferably be integrated into a design of the elevator system in such a way that it is perceived as part of this design and is not perceived as disturbing.

The optically recognizable feature arrangement can be selected in such a way that it can only be recognized by the portable computer-controlled device when it is located at a predetermined position outside the elevator shaft. The optically recognizable feature arrangement can be recognized by the portable computer-controlled device, for example, by taking and then analyzing a photo of the surroundings of the elevator shaft.

According to one embodiment, the portable computer-controlled device can output the maintenance completion signal to an external data cloud, and a further maintenance completion signal can then be output from the data cloud to the elevator controller.

In other words, after the portable computer-controlled device has recognized the machine-detectable feature, it can generate the maintenance completion signal and transmit this via a data connection to an external computer that is part of a data cloud. The data connection can be designed as part of a network, for example the internet. The data cloud or the external computer can, for example, be part of an external elevator monitoring center. When the maintenance completion signal is received, the data cloud or the external computer can then itself generate a further maintenance completion signal and send this to the elevator controller of the corresponding elevator system so that it can then complete the maintenance mode in the elevator system.

In a specific embodiment of this embodiment, the portable, computer-controlled device can output the maintenance completion signal together with an identification signal that uniquely identifies the elevator system to the external data cloud. A further maintenance completion signal can then be output from the data cloud to the elevator controller of the elevator system indicated by the identification signal.

In other words, the portable computer-controlled device cannot only output the maintenance completion signal, which indicates that the machine-detectable feature has been recognized, but also an identification signal can be output, by means of which the identity of the elevator system in which the machine-detectable feature was recognized can be clearly identified. In the data cloud, these two pieces of information can then be used in order to be able to specifically route the further maintenance completion signal generated there to the elevator controller indicated by the identification signal and thereby to be able to cause the elevator controller to complete the maintenance mode.

With regard to the examples set out above, this can mean that a signal from an RFID transponder contains signal components by means of which the elevator system which is uniquely characterized by the RFID transponder can be identified. Alternatively, information about the identity of the elevator system can be contained in an optically recognizable feature arrangement in an elevator system, which information can be extracted, for example, by image analysis. Upon receipt of the RFID signal or through an image analysis of a recording of the optically recognizable feature arrangement, the portable computer-controlled device can thus infer the identity of the corresponding elevator system and transmit a corresponding identification signal to the data cloud together with the maintenance completion signal.

According to an alternative embodiment, the portable computer-controlled device can output the maintenance completion signal directly to the elevator controller.

In this case, the portable computer-controlled device can exchange signals or data directly with the elevator controller, preferably via an interface. The interface can be wired or wireless. For example, a radio network generated in a building can be used to allow the portable computer-controlled device to communicate with the elevator controller. If the portable computer-controlled device can communicate with a plurality of different elevator controllers, it can be useful in this case that the machine-detectable feature of the corresponding elevator system is uniquely assigned, so that by suitable analysis of this feature it can be determined with which of the elevator controls the portable computer-controlled device is to communicate and to which of the elevator controls the portable computer-controlled device should transmit the maintenance completion signal.

It is pointed out that some of the possible features and advantages of the invention are described herein with reference to different embodiments, which relate partly to the method and partly to the elevator control arrangement used for the implementation thereof for controlling the maintenance mode of the elevator system. A person skilled in the art recognizes that the features can be combined, transferred, adjusted, or exchanged in a suitable manner in order to arrive at further embodiments of the invention.

Embodiments of the invention will be described below with reference to the accompanying FIGURE, with neither the FIGURE nor the description being intended to be interpreted as limiting the invention.

DESCRIPTION OF THE DRAWINGS

FIG. 1 shows an elevator system in which a maintenance mode can be completed using an elevator control arrangement according to the invention by carrying out a method according to the invention.

The FIGURE is merely schematic and is not to scale.

DETAILED DESCRIPTION

FIG. 1 shows an elevator system 1 having an elevator control arrangement 3, with the aid of which a maintenance mode of the elevator system 1 can be completed in a targeted manner, according to an embodiment of the present invention.

In order to be able to carry out maintenance work in the elevator system 1, a technician 13 can previously set a maintenance mode in the elevator system 1 so that the elevator system 1 can no longer be used by passengers and the technician 13 can control movements of an elevator car of the elevator system 1 while it is located within an elevator shaft 15, for example. The movements of the elevator car are coordinated by an elevator controller 9 which controls an elevator drive 23. The technician 13 can enter the elevator shaft 15 through an elevator shaft door 17.

When the maintenance work is completed, the technician 13 leaves the elevator shaft 15 and closes the elevator shaft door 17. In order to then complete the maintenance mode in the elevator system 1, the technician 13 can use his portable computer-controlled device 5, such as his smartphone, to signal to the elevator control arrangement 3 that he has left the elevator shaft 15, so that the elevator system 1 is in a state that is safe for the technician 13, and that the maintenance mode is to be completed.

For this purpose, the technician 13 can hold his portable computer-controlled device 5, for example, close to an operating panel 19 which is normally used by passengers in order to request the elevator car by pressing call buttons 21. A machine-detectable feature 7, which can be recognized by the portable computer-controlled device 5 of the technician 13, can be integrated in the operating panel 19 without being visible from the outside.

For example, the machine-readable feature 7 can be designed in the form of an RFID transponder 8. If the portable computer-controlled device 5 is brought close enough to this RFID transponder by the technician 13, a sensor system in the computer-controlled device 5 can suitably emit radio waves and detect radio waves which are reflected by the RFID transponder 8. In this way, it can be recognized that the technician 13 having his computer-controlled device 5 is close to the operating panel 19 and thus located outside the elevator shaft 15.

In addition, the technician 13 authorizes himself using his personal computer-controlled device 5 to be allowed to complete the maintenance mode in the elevator system 1. If necessary, the portable computer-controlled device 15 can additionally be set up to first request the technician 13 to input, for example, a personal identification number or a password in order to authenticate himself.

When the portable computer-controlled device 5 has recognized the machine-readable feature 7, it generates a maintenance completion signal. This maintenance completion signal can then be transmitted to external computers of a data cloud 11, which can be arranged, for example, in a remote elevator monitoring center. Together with the maintenance completion signal, an identification signal that uniquely identifies the elevator system 1 can also be transmitted to the data cloud 11. This identification signal can, for example, be derived from the reflected signal from the RFID transponder. By means of this identification signal, it can be recognized in the data cloud 11 in which elevator system 1 the technician 13 is currently located and thus in which elevator system 1 the maintenance mode is currently to be completed. The data cloud 11 can then transmit a further maintenance completion signal to the elevator controller 9 in the corresponding elevator system 1. The elevator controller 9 can then complete the maintenance mode and return to a normal operating mode in which the elevator drive 23 follows the call and destination requests made by passengers.

Alternatively, the portable computer-controlled device 5 can also transmit the generated maintenance completion signal directly to the elevator controller 9 when the machine-readable feature 7 is recognized.

A data or signal transmission between the portable computer-controlled device 5 and the data cloud 11 and/or the elevator controller 9 can be wire-based or wireless, for example via radio (e.g., WLAN or Bluetooth) and preferably including a local or global network such as the internet.

As an alternative to implementing the machine-readable feature 7 with the aid of an RFID transponder 8, the machine-readable feature can also be implemented using a plurality of different other technical implementations. For example, a barcode or QR code 8 can be provided at a hidden location outside the elevator shaft 15, which barcode can be read out using a scanner that is integrated in the portable computer-controlled device 5. As a further alternative, a small transmitter 8 can be provided outside the elevator shaft 15 which, for example, emits electromagnetic or optical signals, the signals being able to be recognized by the computer-controlled device 5 when it comes close enough to the transmitter.

As a further specific embodiment, an optically recognizable feature arrangement can be provided in the elevator system 1, which can be recognized, for example, by image analysis of an image recorded by the portable computer-controlled device 5. For example, the operating panel 19 can be designed in a special way and/or arranged at a specific position relative to other components of the elevator system 1, so that this results in an image that uniquely characterizes the elevator system 1; for example, the image can be recognized by a camera of the portable computer-controlled device 5 using image analysis.

Finally, it should be noted that terms such as "having," "comprising," etc. do not preclude other elements or steps, and terms such as "a" or "an" do not preclude a plurality of elements or steps. Furthermore, it should be noted that features or steps that have been described with reference to one of the above embodiments can also be used in combination with other features or steps of other embodiments described above.

In accordance with the provisions of the patent statutes, the present invention has been described in what is considered to represent its preferred embodiment. However, it should be noted that the invention can be practiced otherwise than as specifically illustrated and described without departing from its spirit or scope.

LIST OF REFERENCE SIGNS

1 Elevator system
3 Elevator control arrangement
5 Portable computer-controlled device
7 Machine-readable feature
8 RFID transponder
9 Elevator controller
11 Data cloud
13 Technician
15 Elevator shaft
17 Elevator shaft door
19 Operating panel
21 Call button
23 Elevator drive

The invention claimed is:

1. A method for controlling a maintenance mode operation of an elevator system, the method comprising the steps of:

recognizing a machine-detectable feature automatically using a portable computer-controlled device of a technician, wherein the machine-detectable feature can only be detected by the portable computer-controlled device when the portable computer-controlled device is located outside an elevator shaft of the elevator system, and wherein the machine-detectable feature is uniquely assigned to the elevator system, wherein the machine-detectable feature is an optically recognizable feature arrangement that is uniquely assigned to the elevator system and the portable computer-controlled device detects the machine-detectable feature by optically recognizing the optically recognizable feature arrangement;

outputting a maintenance completion signal from the portable computer-controlled device in response to the recognition of the machine-detectable feature;

receiving the maintenance completion signal, or a further maintenance completion signal output in response to the maintenance completion signal, by an elevator controller controlling the maintenance mode operation of the elevator system; and completing the maintenance mode operation by the elevator controller.

2. The method according to claim 1 including outputting the maintenance completion signal only when the technician having the portable computer-controlled device is located outside the elevator shaft.

3. The method according to claim 1 wherein the portable computer-controlled device requires the technician to authorize himself on the portable computer-controlled device before outputting the maintenance completion signal.

4. The method according to claim 1 wherein the machine-detectable feature is an RFID transponder and the portable computer-controlled device recognizes the machine-detectable feature by reading out the RFID transponder.

5. The method according to claim 1 wherein the portable computer-controlled device outputs the maintenance completion signal to an external data cloud and in response the further maintenance completion signal is output from the data cloud to the elevator controller.

6. The method according to claim 5 wherein the portable computer-controlled device outputs the maintenance completion signal together with an identification signal that uniquely identifies the elevator system to the external data cloud and the further maintenance completion signal is output from the data cloud to the elevator controller of the elevator system indicated by the identification signal.

7. The method according to claim 1 wherein the portable computer-controlled device outputs the maintenance completion signal directly to the elevator controller.

8. A computer program product comprising computer program instructions that, when stored on a non-transitory computer-readable medium and executed by a processor of an elevator system, instruct a programmable elevator control arrangement to perform the method steps according to claim 1.

9. A non-transitory computer-readable medium having the computer program product according to claim 8 stored thereon.

10. An elevator control arrangement for controlling a maintenance mode in an elevator system, the elevator control arrangement comprising:

a machine-detectable feature within the elevator system that can only be detected by a portable computer-controlled device that is located outside an elevator shaft of the elevator system and wherein the machine-detectable feature is uniquely assigned to the elevator system;

wherein the machine-detectable feature is an optically recognizable feature arrangement that is uniquely assigned to the elevator system and the portable computer-controlled device detects the machine-detectable feature by optically recognizing the optically recognizable feature arrangement;

wherein the portable computer-controlled device is adapted to automatically recognize the machine-detectable feature and, in response, output a maintenance completion signal; and an elevator controller for controlling the maintenance mode that is adapted to complete the maintenance mode in response to receiving the maintenance completion signal.

11. A method for controlling a maintenance mode operation of an elevator system, the method comprising the steps of:

recognizing a machine-detectable feature automatically using a portable computer-controlled device of a technician, wherein the machine-detectable feature can only be detected by the portable computer-controlled device when the portable computer-controlled device is located outside an elevator shaft of the elevator system, and wherein the machine-detectable feature is uniquely assigned to the elevator system;

outputting a maintenance completion signal from the portable computer-controlled device in response to the recognition of the machine-detectable feature;

receiving the maintenance completion signal, or a further maintenance completion signal output in response to the maintenance completion signal, by an elevator controller controlling the maintenance mode operation of the elevator system;

wherein the portable computer-controlled device outputs the maintenance completion signal to an external data cloud and in response the further maintenance completion signal is output from the data cloud to the elevator controller;

wherein the portable computer-controlled device outputs the maintenance completion signal together with an identification signal that uniquely identifies the elevator system to the external data cloud and the further maintenance completion signal is output from the data cloud to the elevator controller of the elevator system indicated by the identification signal; and completing the maintenance mode operation by the elevator controller.

* * * * *